United States Patent [19]

Boudreaux

[11] Patent Number: 4,653,038

[45] Date of Patent: Mar. 24, 1987

[54] RECORD SUPPORT APPARATUS

[76] Inventor: John C. Boudreaux, Rte. 1, Box 189, Lexington, Okla. 73051

[21] Appl. No.: 720,721

[22] Filed: Apr. 8, 1985

[51] Int. Cl.⁴ .......................... B65G 7/12; G11B 3/58
[52] U.S. Cl. ...................................... 369/72; 15/268; 294/25; 369/292
[58] Field of Search ................ 15/268; 294/25, 26; 369/72, 291, 292

[56] References Cited

U.S. PATENT DOCUMENTS

| | | | |
|---|---|---|---|
| 2,977,127 | 3/1961 | Mertes | 369/72 |
| 3,282,589 | 11/1966 | Morrison | 369/291 |
| 3,961,819 | 6/1976 | Yocum | 294/1.1 |
| 4,084,824 | 4/1978 | Kalivos | 369/72 |
| 4,174,130 | 11/1979 | Mayfield | 294/25 |
| 4,194,464 | 3/1980 | Dye et al. | 15/268 |

Primary Examiner—Steven L. Stephan
Attorney, Agent, or Firm—Laney, Dougherty, Hessin & Beavers

[57] ABSTRACT

A support apparatus which allows a user to hold a phonograph record in one hand without contacting any playing surface thereof. The apparatus has an elongated body wih a spindle extending normally from one end thereof and a substantially curvilinear hook extending from an opposite end in a plane substantially perpendicular to a central axis of the spindle. The spindle defines a notch therein facing the hook. Extending from the body at an intermediate portion between the spindle and hook is a record support pedestal having an upper surface of contact. When in operation, the spindle is inserted into the central opening of a phonograph record and the user engages a thumb in the hook and the remaining fingers of the same hand are engaged with the outer edge of the record. By squeezing the thumb and fingers together, the inner edge of the record engages the notch in the spindle, and a side of the record rests on the upper surface of the pedestal. Preferably, the upper surface of the pedestal only contacts the label of the record.

20 Claims, 3 Drawing Figures

RECORD SUPPORT APPARATUS

BACKGROUND OF THE INVENTION

1. Field of the Invention

This invention relates to support apparatus for a phonograph record, and more particularly, to a support apparatus which allows a user to hold a phonograph record during cleaning without contacting the playing surfaces thereof.

2. Description of the Prior Art

As is known in the art, it is extremely critical that the playing surfaces of phonograph records be maintained in a clean condition. Difficulty arises, however, in trying to hold the phonograph record without touching the playing surfaces during cleaning thereof. A common way of cleaning phonograph records is simply to place the record in position on a turntable and clean it in this flat position. This normally involves hand-turning of the turntable which may have undesirable effects on the turntable, and also precludes use of the turntable while cleaning records.

U.S. Pat. No. 4,084,824 to Kalivas discloses a device to assist in holding a playing record during cleaning. The apparatus consists of a snug-fitting thumb cover providing at its closed end a hook element for insertion into the hole in a record. The thumb cover is secured on a user's thumb and a phonograph record is clamped in place by fingers touching the outer edge thereof. This is distinguishable from the present invention which is not secured to the thumb and which includes a support pedestal to help stabilize the record while in position thereon.

U.S. Pat. No. 4,194,464 to Dye discloses a pad upon which a record may be placed during cleaning. The apparatus in effect acts as a stationary flat support. This apparatus is clearly distinguished from the present invention and has the disadvantage that it must be cleaned from time to time.

U.S. Pat. No. 3,282,589 to Morrison and U.S. Pat. No. 3,961,819 to Yocum disclose devices for holding a phonograph record while being removed from or inserted into a record jacket. The handling device of Morrison could be utilized during cleaning of a record, but could not be held in as stable a position as the apparatus of the present invention. The tool of Yocum could not easily be utilized for cleaning a record because it encloses a significant portion of the edge of the record.

SUMMARY OF THE INVENTION

The present invention is a support apparatus for holding a phonograph record during cleaning, the record being of the type having an inner edge defining a central opening therethrough, parallel sides with playing surfaces and attached labels, and an outer edge. The apparatus comprises spindle means insertable in the central opening and hand engaging means for engaging a portion of a hand of a user, preferably a thumb, whereby the outer edge of the record may be engaged by a second portion of the same hand, preferably the fingers. When the hand portions are squeezed together, the record is biased such that a portion of the inner edge bears against the spindle means. Preferably, a support means is included upon which a portion of a side of the record may rest when the apparatus and record are engaged by the hand of the user.

In the preferred embodiment, the apparatus comprises a body portion with the spindle means being characterized by a substantially cylindrical spindle extending from one end of the body, the support means bieng characterized by a record support pedestal on the body and having a surface of contact engageable with the side of the record, and the hand engaging means being characterized by a substantially curvilinear hook extending from the body. The spindle defines a notch therein on a side thereof facing the curvilinear hook, such that when the apparatus and record are engaged by the hand of the user, the inner edge of the record fits into and bears against a portion of the notch. The spindle extends substantially perpendicular to the body at one end thereof and the hook extends in a plane substantially perpendicular to the central axis of the spindle. The surface of contact of the pedestal preferably does not contact the playing surface of the record and defines a plane at an acute angle with the central axis of the spindle.

An important object of the invention is to provide an apparatus for securely holding a phonograph record during cleaning.

Another object of the invention is to provide an apparatus for holding a phonograph record whereby a user may hold a record in one hand and clean a playing surface thereof with the other.

A further object of the invention is to provide a record support apparatus which contacts only non-playing surfaces of the record.

Additional objects and advantages of the invention will become apparent as the following detailed description of the preferred embodiment is read in conjunction with the accompanying drawings which illustrate such preferred embodiment.

DETAILED DESCRIPTION OF THE PREFERRED EMBODIMENT

Figure 1:
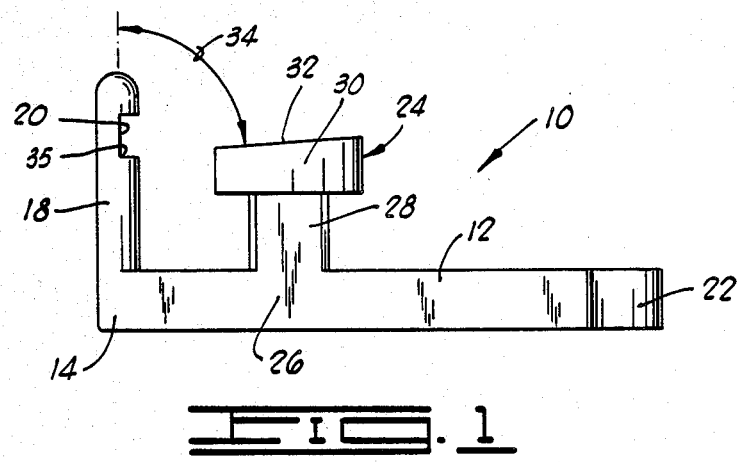
FIG. 1 shows a side view of the record support apparatus of the present invention.

Referring now to the drawings, the record support apparatus of the present invention is generally designated by the numeral 10. Apparatus 10 has a main body 12 having a first end 14 and an opposite second end 16. In the preferred embodiment, but not by way of limitation, body 12 is an elongated parallelepiped having a substantially square cross section.

Extending upwardly from first end 14 of body 12 is a substantially cylidrical spindle 18 defining a central axis therethrough which is perpendicular to a longitudinal axis of body 12. Spindle 18 further defines a notch 20 which generally faces toward second end 16 of body 12.

Figure 2:
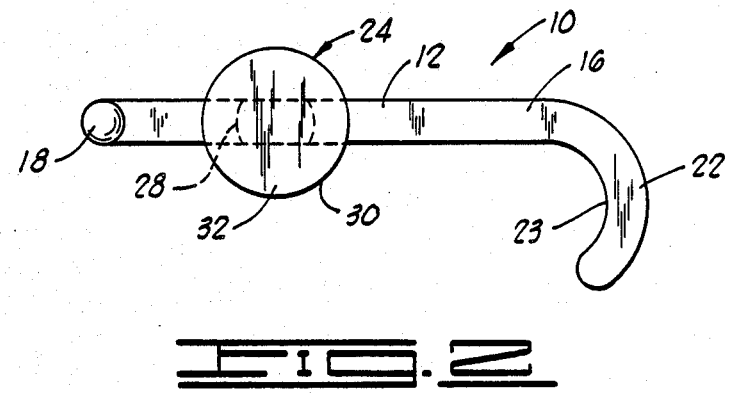
FIG. 2 illustrates a plan view of the apparatus.

Extending from second end 16 of body 12 is a substantially curvilinear hook 22 having an inner surface 23. As shown in FIGS. 1 and 2, hook 22 extends from body 12 is a plane substantially perpendicular to the central axis of spindle 18. Preferably, but not by way of limitation, hook 22 is of the same substantially square cross section as body 12.

A support pedestal 24 extends upwardly from an intermediate portion 26 of body 12 positioned between first end 14 and second end 16. Support pedestal 24 includes a stem portion 28 and an upper portion 30. Preferably, but not by way of limitation, upper portion 30 is in the form of a substantially circular disc which defines an upper surface of contact 32. As shown in FIG. 1, upper surface of contact 32 is substantially flat and defines a plane which is at an acute angle, represented by the numeral 34, with respect to the central axis of spindle 18. This angle 34 is in the range of approximately 75° to 85°, and in the preferred embodiment is 83½°, but it will be clear to those skilled in the art that other angles would also be acceptable. It will also be clear that surface of contact 32 can simply be perpendicular to the central axis of spindle 18. If the plane defined by upper surface of contact 32 were examined, it would intersect notch 20, preferably at lower corner 35. Thus, surface 32 and at least a portion of notch 20 are coplanar.

Figure 3:
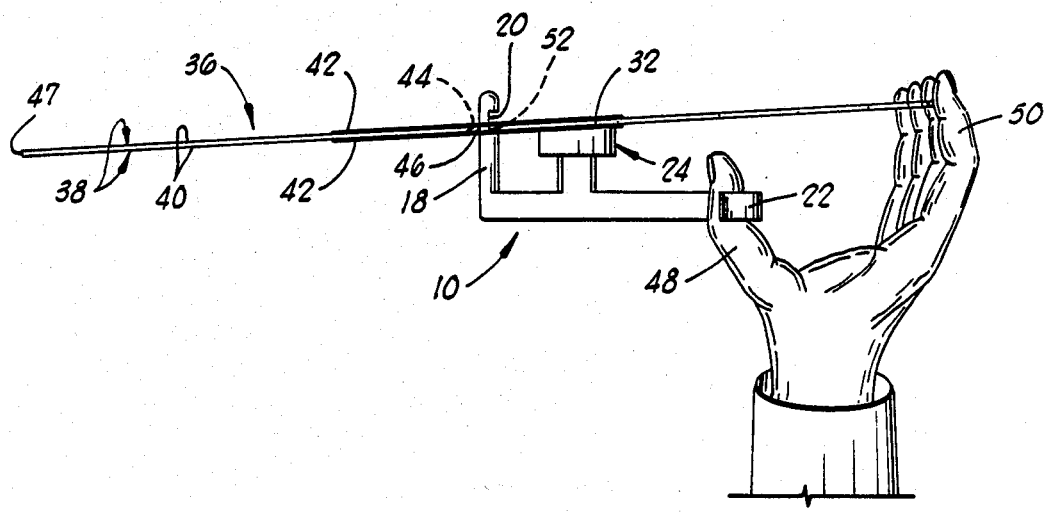
FIG. 3 illustrates the apparatus in use with a phonograph record positioned thereon.

In FIG. 3, a phonograph record 36 is shown in a supported position on apparatus 10. Preferably, record 36 is of the circular type having a pair of parallel opposite sides 38, each side having a playing surface portion 40 and a label 42 affixed thereto. The record has an inner edge 44 which defines a central opening or hole 46 therethrough and an outer edge 47. A user of the apparatus engages a first portion of one hand, preferably a thumb 48, against inner surface 23 of hook 22 and engages a second portion of the hand, preferably at least one finger 50, against outer edge 47 of record 36. By squeezing the thumb and fingers together, it will be seen that record 36 is biased such that a portion of inner edge 44 engages notch 20 as indicated by reference numeral 52. In this way, record 36 is held firmly in place by apparatus 10 and the hand of the user. In this position, a portion of lower side 38 of record 36 is in supported contact against upper surface 32 of pedestal 24. In the preferred embodiment, upper surface 32 only contacts label 42 of record 36 and not any portion of playing surface 40.

As will be seen by those skilled in the art, when apparatus 10 is used in the manner illustrated in FIG. 3, record 36 can be held in a rigid and well-supported position by one hand of a user and cleaned with an appropriate instrument held in the other hand. It will also be seen that the apparatus could be adapted to hold any kind of flat plate having a hole therein and is not necessarily limited to usage with phonograph records.

It can be seen, therefore, that the record support apparatus of the present invention is well adapted to carry out the objects and attain the ends and advantages mentioned, as well as those inherent therein. While a presently preferred embodiment of the invention has been described for the purposes of this disclosure, numerous changes in the construction and arrangement of parts can be made by those skilled in the art. All such changes are encompassed within the scope and spirit of this invention as defined by the appended claims.

What is claimed is:

1. Apparatus for holding a substantially flat plate of the type having a side, an inner edge defining a central opening therethrough and an outer edge, said apparatus comprising:
   spindle means insertable in said central opening of said plate and engageable with said inner edge thereof;
   support means spaced from said spindle means upon which a substantially flat portion of said side of said plate may rest when said spindle means is inserted in said central opening of said plate; and
   hand engaging means for engaging a first portion of a hand of a user, whereby:
      said outer edge of said plate is engaged by a second portion of said hand of said user when said plate is resting on said support means; and
      when said hand portions are squeezed together, said plate is biased such that a portion of said inner edge of said plate bears against said spindle means.

2. The apparatus of claim 1 wherein said spindle means is characterized by a spindle defining a notch therein, said notch being engaged by said inner edge of said plate when said plate is biased by squeezing said hand portions together.

3. The apparatus of claim 1 wherein said support means is characterized by a pedestal having a surface of contact engageable with said side of said plate.

4. The apparatus of claim 3 wherein:
   said flat plate is characterized as a phonograph record with a side having a playing surface and a label affixed thereto; and
   said surface of contact of said pedestal engages only said label.

5. The apparatus of claim 1 wherein said hand-engaging means is characterized by a substantially curvilinear hook.

6. Apparatus for holding a phonograph record of the type having a side with a playing surface and a label affixed thereto, an inner edge defining a central opening therethrough and an outer edge, said apparatus comprising:
   a body;
   a spindle having a central axis and extending from said body, said spindle being insertable in said central opening of said phonograph record;
   a record support pedestal on said body spaced radially outwardly from said spindle and having a surface of contact engageable with said side of said record; and
   hand engaging means extending from said body for engaging a first portion of a hand of a user, whereby:
      said outer edge of said record is engaged by a second portion of said hand of said user when said spindle is inserted in said central opening; and
      when said hand portions are squeezed together, said record is biased such that at least a portion of said inner edge of said record bears against said spindle.

7. The apparatus of claim 6 wherein said spindle defines a notch therein, said notch being engaged by said inner edge of said phonograph record when said record is biased by squeezing said hand portions together.

8. The apparatus of claim 6 wherein said record support pedestal is positioned between said spindle and said hand-engaging means.

9. The apparatus of claim 6 wherein said record support pedestal surface of contact is engageable only with said label of said record when said spindle is inserted in said central opening.

10. The apparatus of claim 6 wherein said surface of contact is characterized by a substantially flat upper surface in a plane defining an acute angle with said central axis of said spindle.

11. The apparatus of claim 10 wherein said angle is in the range of approximately 75° to 85°.

12. The apparatus of claim 11 wherein said angle is approximately 83½°.

13. The apparatus of claim 6 wherein said hand-engaging means is characterized by a substantially curvilinear hook.

14. Apparatus for holding a phonograph record of the type having a side with a playing surface and a label affixed thereto, an inner edge defining a central opening therethrough and an outer edge, said apparatus comprising:

an elongated body having first and second ends;
a spindle insertable in said central opening of said record and extending from said first end of said body, said spindle defining a notch therein and having a central axis substantially perpendicular to said body;
a curvilinear hook extending from said second end of said body and defining a plane substantially perpendicular to said central axis of said spindle; and
a record support pedestal extending from said body at an intermediate position between said first and second ends and defining an upper surface;
whereby:
when said spindle is inserted into said central opening, said hook is engaged by a thumb of a hand of a user and at least one finger of said hand is engaged with said outer edge of said record; and
when said thumb and finger are squeezed together,
said record is biased such that said inner edge of said record fits into and bears against said notch and a side of said record is in supported contact with said upper surface of said pedestal.

15. The apparatus of claim 14 wherein said upper surface of said pedestal defines a plane which is at an acute angle to said axis of said spindle.

16. The apparatus of claim 15 wherein said angle is in the range of approximately 75° to 85°.

17. The apparatus of claim 16 wherein said angle is approximately 83½°.

18. The apparatus of claim 14 wherein at least a portion of said notch defined by said spindle is co-planar with said upper surface of said pedestal.

19. The apparatus of claim 14 wherein said intermediate position of said pedestal is such that said upper surface of said pedestal contacts only said label of said record when said spindle is inserted in said central opening.

20. Apparatus for holding a phonograph record of the type having a side with a playing surface and a label affixed thereto, an inner edge defining a central opening therethrough and an outer edge, said apparatus comprising:

a body;
a spindle having a central axis and extending from said body, said spindle being insertable in said central opening of said phonograph record;
support means extending from said body and spaced from said spindle for contacting and supporting a portion of said side of said phonograph record; and
a curvilinear hand engaging hook extending from said body for engaging a first portion of a hand of a user, said hook defining a plane substantially perpendicular to said central axis of said spindle, whereby:
said outer edge of said record is engaged by a second portion of said hand of said user when said spindle is inserted in said central opening; and
when said hand portions are squeezed together, said record is biased such that at least a portion of said inner edge of said record bears against said spindle.

* * * * *